Jan. 2, 1940. A. E. BROOKS 2,185,586
MICROPOROUS RUBBER FILTERING MEDIUM
Filed Dec. 20, 1938
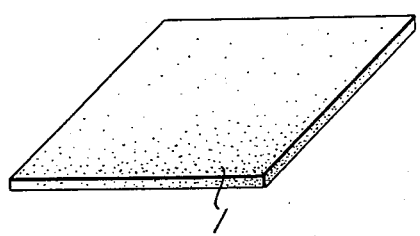
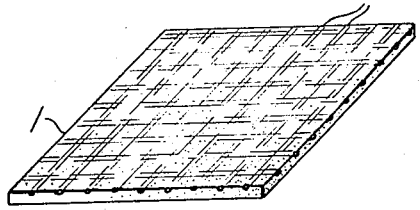
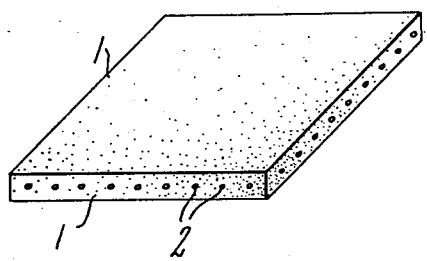
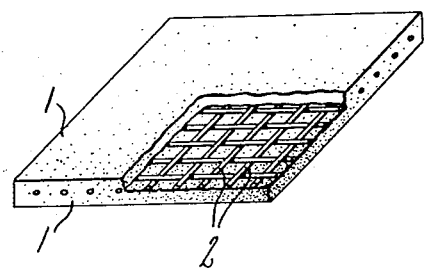
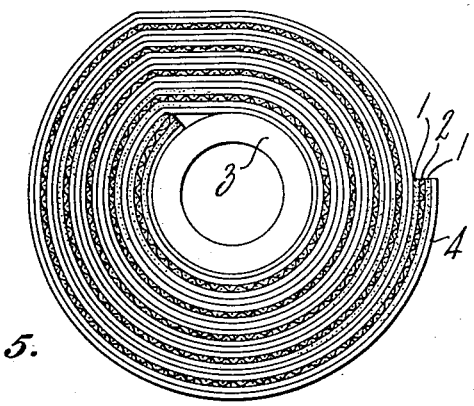
INVENTOR
ARTHUR E. BROOKS
BY Gourley & Budlong
ATTORNEYS Patented Jan. 2, 1940

2,185,586

UNITED STATES PATENT OFFICE 2,185,586

MICROPOROUS RUBBER FILTERING MEDIUM

Arthur E. Brooks, Nutley, N. J., assignor to United States Rubber Company, New York, N. Y., a corporation of New Jersey Application December 20, 1938, Serial No. 246,789

3 Claims. (Cl. 210—205)

This invention relates to improvements in microporous rubber filtering media.

Microporous hard rubber diaphragms are known but they are not suitable as filtering diaphragms, as they are too easily torn or fractured and have a too low bursting strength to be used in industrial filters.

Objects of the present invention are to overcome said mechanical defects and provide filter diaphragms having high permeability, flexibility, adequate bursting strength, and resistance to chemically corrosive materials, whereby they are particularly suited for use in industrial filters. Such diaphragms or sheets are essentially composed of flexible microporous vulcanized hard rubber composition made by mixing a vulcanizable hard rubber composition with a highly hydrous silica gel prior to curing under non-evaporative conditions.

According to the invention the vulcanizable hard rubber composition has applied thereto a layer or ply of a corrosion resistant highly porous webbing in a manner to be partly or wholly embedded in the composition to reenforce the finally cured diaphragm. One such material among others is open weave asbestos cloth made from drafted asbestos fibers. The asbestos fabric is preferably first given an application of latex or rubber cement of a consistency such that the threads thereof are individually coated but the meshes of the fabric are not filled up. The treated fabric is dried and then bonded with the microporous rubber composition by application of the rubber composition to one or both sides of the fabric, by conventional calendering procedure. The whole is then bonded integrally by vulcanization under non-evaporative conditions. The asbestos fabric may be either square woven or of unsymmetrical construction having preferably not more than twenty-two ends per inch in the stronger direction, the area of the interstices being at least 70% of the area of the fabric.

Constructions made according to the present invention have a high degree of porosity in the form of a continuous network of microscopic pores such as cannot be obtained in any of the types of closely woven filter cloths, adequate bursting strength and tear resistance, the normal chemical corrosion resistance of ebonite and a permeability as a filter medium substantially equivalent to that of the unreenforced microporous rubber.

The following table shows this:

|  | Microporous rubber (not reenforced) | Microporous rubber (reenforced with asbestos fabric #543) |
|---|---|---|
| Gauge, inches | .048 | .048 |
| Mullen burst test, lbs/in² | 36 | 106 |
| Percentage voids | 71 | 60 |
| Permeability to water, gal./sq. ft. per min. at 25" vacuum | 5.5 | 5.5 |

Asbestos fabric #543 is a woven asbestos fabric having 22 ends per inch in the warp direction and 15.6 in the filler direction. The calculated porosity of the fabric is 73%.

A preferred compound for the preparation of the microporous rubber used in this invention follows, the parts being by weight:

Rubber (pale crepe) _____ 100
Poly-chloroprene _____ 100
Sulfur _____ 47
Diphenylguanidine _____ 4
Hydrous silica _____ 800

The hydrous silica contains preferably about 28% solids, 72% water. The rubber mix is made by conventional rubber processing technique and then calendered to give sheets of the desired thickness, usually 0.10" to .030". Two such sheets are plied up with a layer of asbestos fabric between the sheets of microporous rubber composition. An alternate construction is to apply the microporous rubber composition to one side of the asbestos fabric so that it is at least partially embedded. The asbestos fabric may be given a coating of latex or rubber cement beforehand to increase the adhesion, the coating being sufficiently thin that the meshes are not filled up but thick enough that the threads are individually coated. The composite sheet is then vulcanized under non-evaporative conditions; for example, 4 hours in saturated steam at 70 lbs. pressure, or under water.

The hard rubber composition of the composite diaphragm is flexible and capable of being folded on itself without breaking by virtue of the presence therein of the poly-chloroprene, which is not itself capable of conversion to a hard state resembling ebonite. It is to be understood that other flexibility-imparting plastics having such a property of chloroprene may be used in place thereof in the composition and are to be considered the equivalent thereof for the purpose of the invention. For example, Vistanex (polyisobutylene), AXF (plastic elastic reaction product of benzene and ethylene chloride), etc.

The figures of the attached drawing illustrate the several stages in the preparation of the improved microporous rubber filter diaphragm disclosed herein.

Figure 1 represents a thin sheet 1 of flexible microporous hard rubber composition.

Figure 2 represents a sheet of this material which has been reenforced by applying a layer 2 of open weave asbestos cloth to one side of the porous material, as aforesaid.

Figure 3 represents a layer of the same asbestos cloth sandwiched between two sheets of the microporous hard rubber 1 and the whole integrally bonded by vulcanization.

Figure 4 represents a cut away-view of the same construction as Figure 3 to show the presence of the woven asbestos cloth.

Figure 5 represents a method of preparation of long strips of the desired product by winding upon a mandrel 3 superimposed layers of a wet cloth liner 4, a sheet of the vulcanizable hard rubber composition 1, an asbestos fabric 2, and a second sheet of the vulcanizable hard rubber composition 1. This composite pack is then cured under non-evaporative conditions.

The filter diaphragms made by this method have the properties of excellent retention of fine precipitates. The filter cake can be removed readily due to the relatively smooth surface of the product and the absence of fibers from the filtering surface. Tests on filtration of ore slurries have indicated but little tendency to blinding of pores under continued use. The product has a high degree of flexibility and can be subjected to folding on itself without breaking. This type of diaphragm has the unique property of being reenforced by a fabric which has resistance to chemically corrosive liquids to a degree practically equivalent to that of ebonite.

It is to be understood that the example given using hydrous silica is not to be limited thereto but that other known micropore-producing materials may be used therefor, such as hydrophilic clays, starch, etc.

Permeability of the diaphragm may be increased further by dissolving out the silica with a solution of alkali.

The term "rubber" is used here to refer to vulcanizable caoutchouc compositions.

Having thus described my invention, what I claim and desire to protect by Letters Patent is:

1. A flexible filter diaphragm composed essentially of flexible microporous vulcanized hard rubber composition, said composition per se having a low bursting strength, in combination with an embedded integral permanent reenforcement of a layer of foraminous corrosion-resistant webbing of a character which does not substantially lessen the water permeability of the microporous rubber composition, the reenforced diaphragm as a whole being further characterized as having a high bursting strength and being capable of being folded on itself without breaking.

2. A flexible filter diaphragm composed essentially of flexible microporous vulcanized hard rubber composition, said composition per se having a low bursting strength, in combination with an embedded integral permanent reenforcement of a layer of open weave asbestos fabric, the reenforced diaphragm as a whole being further characterized as having a high bursting strength and being capable of being folded on itself without breaking.

3. A flexible filter diaphragm composed essentially of flexible microporous vulcanized rubber composition which composition is bonded internally to a ply of open weave asbestos fabric, the composite diaphragm having a water permeability not substantially less than the microporous rubber composition per se and being further characterized as being capable of being folded on itself without breaking.

ARTHUR E. BROOKS.

CERTIFICATE OF CORRECTION.

Patent No. 2,185,586. January 2, 1940.

ARTHUR E. BROOKS.

It is hereby certified that error appears in the printed specification of the above numbered patent requiring correction as follows: Page 1, second column, line 31, for "0.10''" read --.010''--; and that the said Letters Patent should be read with this correction therein that the same may conform to the record of the case in the Patent Office.

Signed and sealed this 11th day of June, A. D. 1940.

(Seal)

Henry Van Arsdale,
Acting Commissioner of Patents.